United States Patent [19]

Davidow et al.

[11] Patent Number: 4,750,179
[45] Date of Patent: Jun. 7, 1988

[54] SELECTIVE PREVENTION OF BIPOLAR VIOLATION DETECTION

[75] Inventors: Clifford A. Davidow; David J. Evans, both of Reno, Nev.

[73] Assignee: Lynch Communications Systems, Inc., Claremont, N.C.

[21] Appl. No.: 859,027

[22] Filed: May 2, 1986

[51] Int. Cl.⁴ ............................................ G06F 11/00
[52] U.S. Cl. ....................................... 371/57; 371/56
[58] Field of Search ................. 371/57, 22, 56; 379/2, 379/12, 26; 375/17, 20

[56] References Cited

U.S. PATENT DOCUMENTS

| | | | |
|---|---|---|---|
| 3,502,810 | 3/1970 | Aaron | 375/17 |
| 3,983,340 | 9/1976 | Lima | 379/2 |
| 4,032,886 | 6/1977 | En | 371/46 X |
| 4,078,159 | 3/1978 | Lender | 375/17 X |
| 4,086,566 | 4/1978 | Lender | 371/56 |
| 4,581,741 | 4/1986 | Huffman | 371/57 X |

Primary Examiner—Jerry Smith
Assistant Examiner—Robert W. Beausoliel
Attorney, Agent, or Firm—Peter C. Van der Sluys

[57] ABSTRACT

Bipolar violation error counters are rendered insensitive to bipolar violations arising from the presence of bipolar eight-zero suppression (B8ZS) patterns in a bipolar pulse train by detecting B8ZS patterns in the pulse train applied to the error counter, and zeroing those bits of the B8ZS pattern which produce bipolar violations.

15 Claims, 4 Drawing Sheets

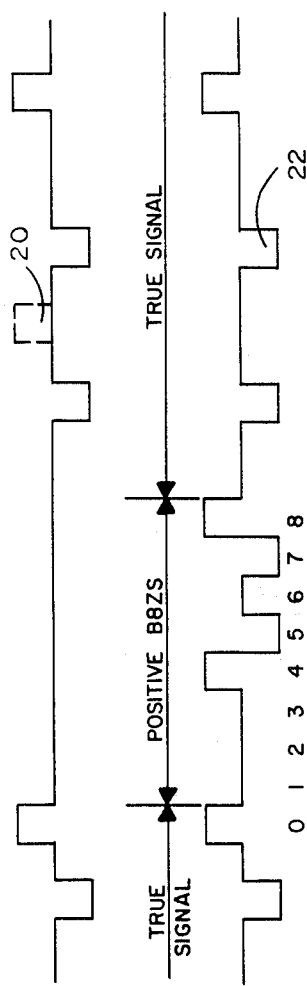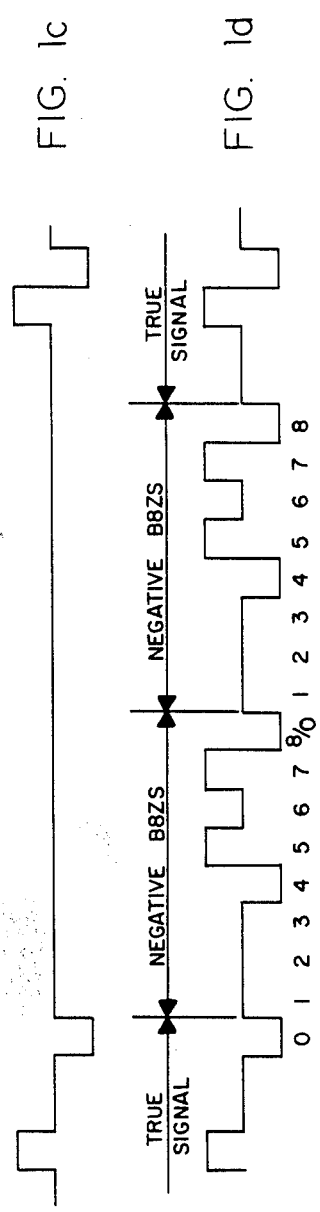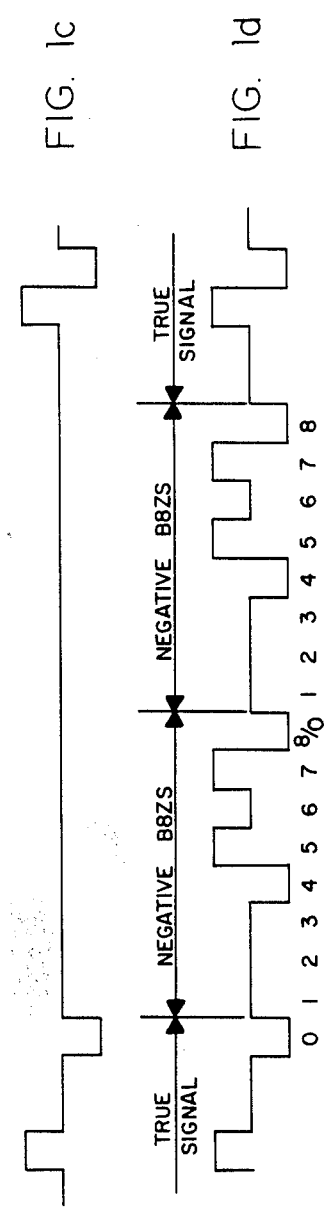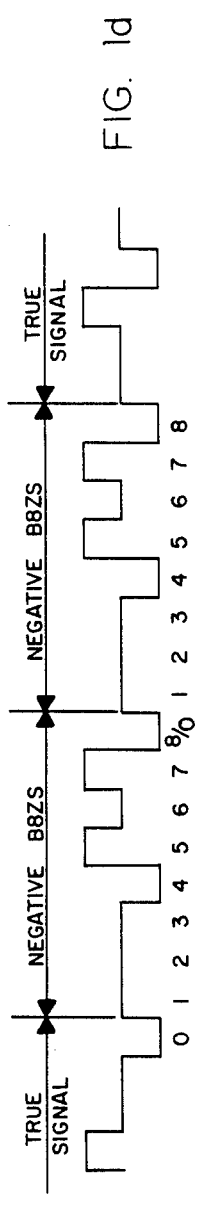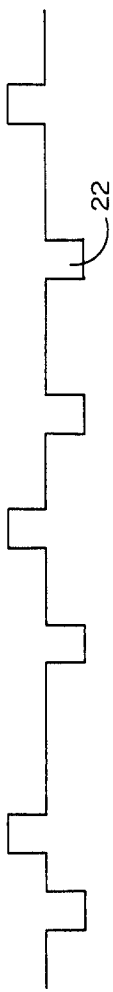

SELECTIVE PREVENTION OF BIPOLAR VIOLATION DETECTION

FIELD OF THE INVENTION

This invention relates to bipolar violation detection for error counters used in determining the probable failure of a span line, and more particularly to an apparatus for preventing purposeful bipolar violations introduced for the suppression of excessive zeros from being counted as errors.

BACKGROUND OF THE INVENTION

Receivers in bipolar pulse code modulated (PCM) telephone systems frequently use the received data pulses to generate an internal clock in synchronism with the received pulse train. In modern high-speed equipment, the required close synchronization tolerances make it necessary for the pulse train to contain a "1" in at least every eighth bit interval. To achieve this result, modern PCM encoders use bipolar eight-zero suppression (B8ZS).

B8ZS works by detecting any sequence of eight consecutive zeros in the pulse train and replacing it with a standardized bit pattern of ones and zeros which contains specific bipolar violations and is therefore recognizable as an artifact indicating eight consecutive zeros when the pulse train is decoded.

Unfortunately, the integrity of a telephone PCM span line is normally tested, at each successive span terminal or span line switch along the line, by counting, i.a., bipolar violation errors. If the error rate exceeds a predetermined threshold, the affected span is automatically taken out of service and replaced with a spare span, as described in U.S. Pat. Nos. 3,983,340 and 4,042,794.

In order to avoid the unnecessary switching of a functioning span by pulse trains containing a large number of B8ZS patterns, it is necessary for span line switches to ignore bipolar violations in B8ZS patterns, but to count all other bipolar violations in the received pulse train as errors.

SUMMARY OF THE INVENTION

The present invention prevents B8ZS patterns from being counted as bipolar violation errors by substituting zeros for the first and third "1"s of the B8ZS pattern in the pulse train which is applied to the error counter. This deletes the purposeful bipolar violations from the B8ZS pattern but does not delete any other bipolar violations.

More specifically, the circuit of the invention continuously examines a nine-bit section of the pulse train stored in a shift register for the presence of a B8ZS pattern. If it detects either a positive or a negative B8ZS pattern, the circuit modifies the contents of the shift register to zero those stages of the shift register which then contain the first and third "1"s of the B8ZS pattern. The output of the shift register is a pulse train with all B8ZS bipolar violations removed.

It is therefore the object of the invention to provide a bipolar violation error counting circuit for span line switches which is insensitive to bipolar violations caused by B8ZS patterns but sensitive to all other bipolar violations.

BRIEF DESCRIPTION OF THE DRAWING

FIG. 1 is a time-amplitude diagram illustrating a pulse train containing a positive "1" followed by ten zeros which are in turn followed by faulty data;

FIG. 1b is a time-amplitude diagram illustrating the transmitted pulse train corresponding to the pulse train of FIG. 1a when B8ZS is used;

FIG. 1c is a time-amplitude diagram illustrating a pulse train containing a negative "1" followed by eighteen zeros;

FIG. 1d is a time-amplitude diagram illustrating the transmitted pulse train corresponding to the pulse train of FIG. 1c when B8ZS is used;

FIG. 4 is a time-amplitude diagram of the pulse train of FIG. 1b after processing by the circuit of FIG. 3.

DESCRIPTION OF THE PREFERRED EMBODIMENT

FIG. 1a shows a typical unrestricted single-rail bipolar pulse train representing PCM-encoded data to be transmitted over a span line. In FIG. 1a, the initial 0101 is followed by ten zeros, which are in turn followed by 1010100010. In the pulse train of FIG. 1a, it has further been assumed that the "1" pulse 20 is not being transmitted, due to some sort of transient or equipment failure.

When the pulse train of FIG. 1a is processed through a B8ZS encoder for transmission over a high-speed span line, the transmitted pulse train takes the form shown in FIG. 1b. In that form, the initial true signal 0101 remains unchanged. The first eight consecutive zeros, however, are replaced by the standard B8ZS pattern 00011011 in which the first and third "1"s are bipolar violations (i.e. they have the same polarity as the preceding "1"). The remaining 001000100010 is a true signal; however, because of the absence of pulse 20, pulse 22 is also a bipolar violation.

FIG. 1c shows a pulse train with eighteen consecutive zeros preceded by a negative-going "1". When this train is B8ZS-encoded (FIG. 1d), the initial 1001 is again followed by the B8ZS pattern 00011011 in which the first and third "1"s are bipolar violations. However, it will be noted that inasmuch as the last "1" of the initial 1001 was negative-going, the polarity of the B8ZS pattern is the reverse of that in FIG. 1b, in which the last "1" of the initial 0101 was positive-going.

Inasmuch as the substitution of the B8ZS pattern for the first eight consecutive zeros in FIG. 1c still leaves ten consecutive zeros, a second B8ZS substitution is made. The polarity of the second B8ZS pattern is the same as that of the first, because the last "1" of the B8ZS pattern always has the same polarity as the last "1" preceding the pattern.

Figure 2:
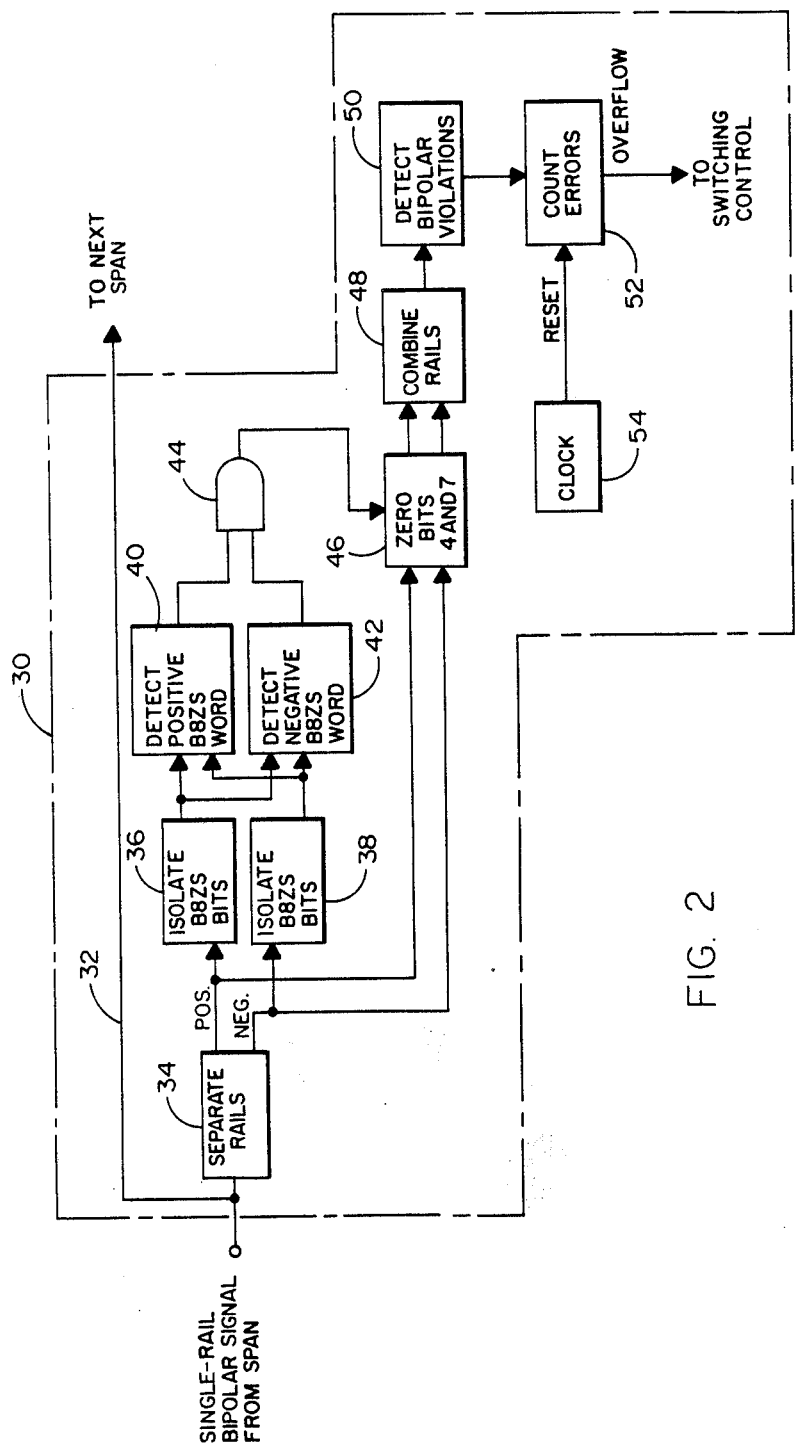
FIG. 2 is an overall functional block diagram of that portion of a span line switch which is involved in the operation of the invention.

The objective of this invention is to prevent the bipolar violations of the B8ZS pattern (and only those violations) from being registered as errors by the span line switches without affecting the transmitted pulse train. How this is accomplished is shown in functional form in FIG. 2. For telephonic communication purposes, the single-rail bipolar pulse train coming into span line switch 30 from a span is transmitted without change to the next span over line 32.

For span quality control and switching purposes, the incoming pulse train is first separated at 34 into a double rail signal, one rail representing the positive-going portions of the incoming pulse train, the other its negative-going portions.

The positive rail is processed at 36, and the negative rail at 38, to isolate those bits which should be "1"s in either a positive or a negative B8ZS pattern. These bits are used at 40 and 42 in combination with a check that all other bits in the pattern are zero, to detect the presence of a positive or negative B8ZS pattern. If either pattern is present, OR gate 44 puts out a signal which causes bits 4 and 7 of the pattern to be zeroed at 46 on both rails. The resulting pulse train, when combined at 48, contains no more B8ZS bipolar violations, but does still contain any bipolar violations that are not part of a B8ZS pattern.

The remaining bipolar violations are detected at 50 and counted at 52. With the count being periodically reset by a clock 54, an overflow indicates an excessive error rate and triggers the switching control of span line switch 30 in a conventional way to substitute a good span for the one which has apparently failed.

Figure 3A:
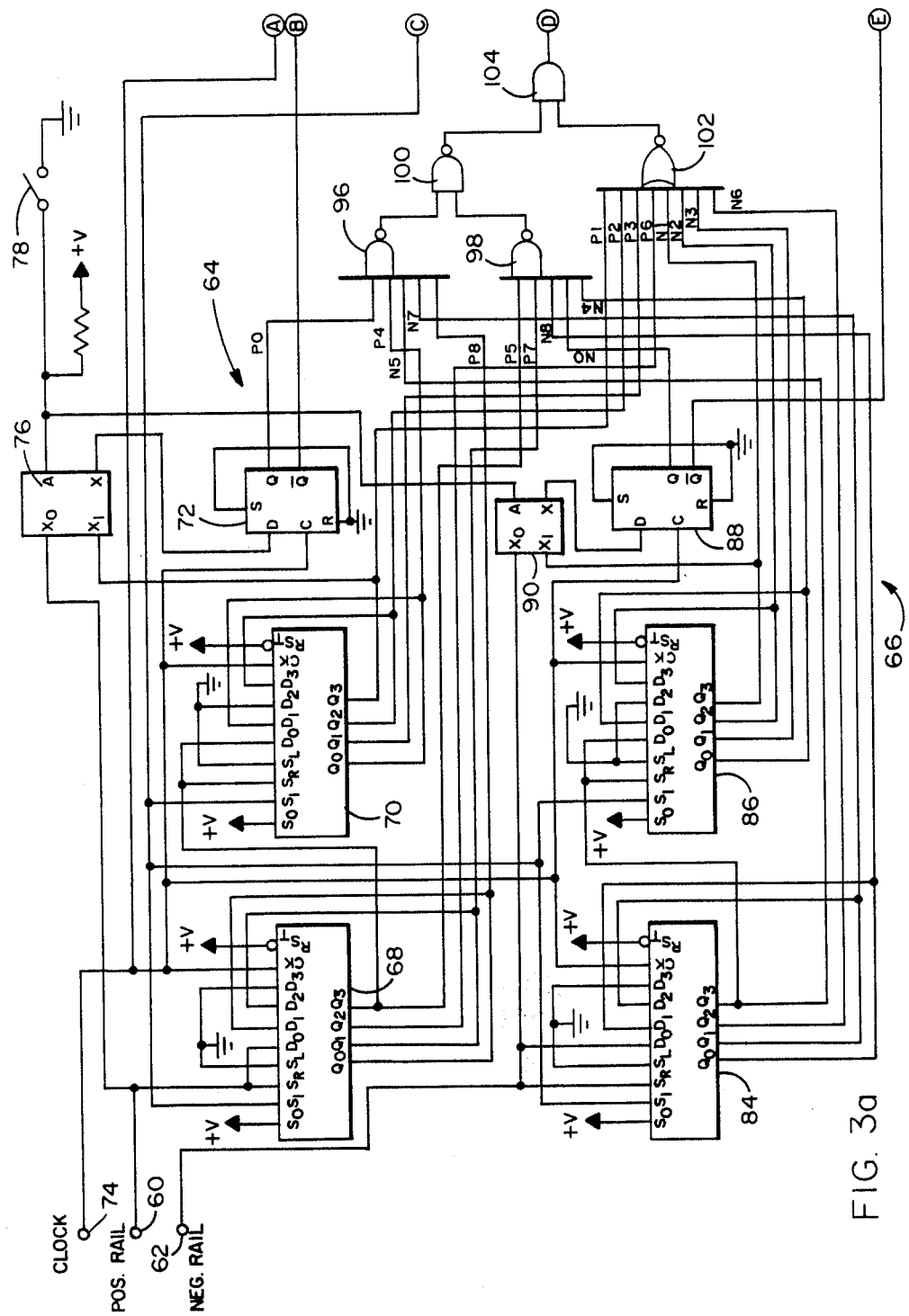
FIGS. 3a and 3b together represent logic diagram of the circuit of this invention.
Figure 3B:
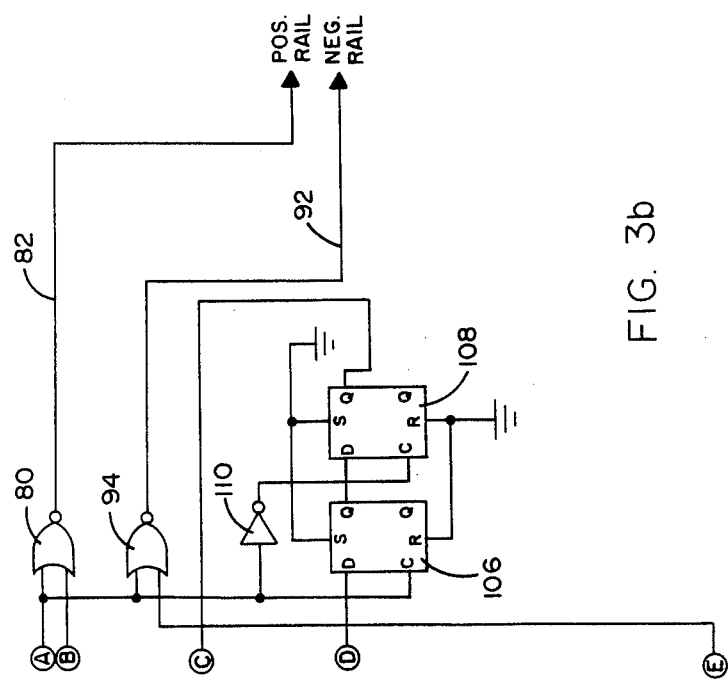

FIG. 3 shows the logic which carries out the B8ZS pattern recognition and modification of this invention. The positive rail signal 60 and the negative rail signal 62, into which the incoming pulse train has previously been split by conventional means (not shown), are applied to a pair of nine-bit shift registers 64, 66, respectively.

The positive shift register 64 is preferably composed of a pair of logic chips 68, 70 and a flip-flop 72. The logic chips 68, 70 (which may be standard 4194B chips) are so constructed that when $S_1$ is low, the chip is in a direct shift mode, and signals applied to $S_R$ are shifted sequentially through $Q_0$, $Q_1$, $Q_2$ and $Q_3$ When $S_1$ is high, however, the logic levels present at inputs $D_0$ through $D_3$ are transferred to $Q_0$ through $Q_3$, respectively, at the leading edges of the clock 74.

In the logic chips 68, 70, $Q_0$ is connected to $D_1$, $Q_1$ to $D_2$, and $Q_2$ to $D_3$. $Q_3$ of chip 68 is connected to $S_R$ and $D_0$ of chip 70; consequently, chips 68 and 70 form a continuous eight-bit shift register $Q_3$ of chip 70 is connected to the D input of flip-flop 72 through a bypass logic 76. The bypass logic 76 is so constructed that when A is low, X is connected to $X_0$; and when A is high, X is connected to $X_1$.

As long as the bypass logic 76 is inactive (by-pass switch 78 open), flip-flop 72 acts as the ninth stage of the nine-bit shift register 64. When bypass switch 78 is closed, however, the flip-flop 72 receives its D input directly from the positive rail 60 and clocks it through unchanged (via a double inversion at flip-flop 72 and NOR gate 80) to the positive rail output 82.

The negative rail signal 62 is treated in the same way as described above by logic chips 84, 86 and flip-flop 88. A bypass logic 90 is provided to convey the signal 62 directly to the negative rail output 92 through flip-flop 88 and NOR gate 94 when bypass switch 78 is closed.

It will be noted in Figs. 1b and 1d that when a B8ZS pattern is taken together with the last preceding "1"as a nine-bit sequence (numbered 0 through 8 in Figs. 1b and 1d), a positive B8ZS pattern will produce "1"s on the positive rail at bits 0, 4 and 8, "1"s on the negative rail at bits 5 and 7, and zeros at bits 1, 2, 3 and 6 on both rails. The reverse is true for a negative B8ZS pattern.

The inputs to NAND gate 96 are positive-rail bit 0 (the earliest bit in any nine-bit sequence appears in flip-flop 72 or 88), positive 4, positive 8, negative 5, and negative 7. Consequently, the output of NAND gate 96 goes low whenever a positive B8ZS pattern is detected in a nine-bit pulse sequence. In like manner, the output of NAND gate 98 goes low whenever a negative B8ZS pattern appears. It follows that the output of NAND gate 100 goes high whenever a B8ZS pattern of either polarity is detected by the shift registers 64, 66.

Bits 1, 2, 3 and 6 from both the positive and negative shift registers 64, 66 are applied to the inputs of NOR gate 102. Consequently, the output of NOR gate 102 goes high whenever bits 1, 2, 3 and 6 are zero on both rails, as will be the case whenever a B8ZS pattern of either polarity is present.

The outputs of NAND gate 100 and NOR gate 102 are combined in AND gate 104, whose output represents the presence of a B8ZS pattern in shift registers 64, 66. The output of AND gate 104 is applied to the D input of a zeroing flip-flop 106 whose delayed Q output is applied to the $S_1$ inputs of chips 68, 70, 84 and 86. Consequently, whenever a B8ZS pattern is present in shift registers 64, 66, all $S_1$ inputs go high, and the Q outputs of chips 68, 70, 84 and 86 become governed by their D inputs.

The Q output of flip-flop 106 undergoes a one-half clock cycle delay by means of a flip-flop 108 clocked through inverter 110 to assure unambiguous operation of the circuit.

The $D_3$ inputs of chips 68, 84 and the $D_2$ inputs of chips 70, 86 are permanently low. At the time when the presence of a B8ZS pattern is detected, bit 4 is at $Q_0$ of chips 70 and 86, and hence also at $D_1$ of those same chips. Simultaneously, bit 7 is at $Q_1$ and $D_2$ of chips 68 and 84. At the next rising edge of the clock 74, bit 4 moves to $Q_1$ of chips 70 and 86, and bit 7 moves to $Q_2$ of chips 68 and 84. One-half clock cycle thereafter, $D_2$ of chips 70, 86 and $D_3$ of chips 68, 84 go low as a result of the Q output of delay flip-flop 108 (and consequently all $S_1$s) going high. At the next rising edge of the clock 74, chips 70, 86 and 68, 84 thus force a "0" into bits 4 and 7 as they are moved to $Q_2$ of chips 70, 86 and $Q_3$ of chips 68, 84, respectively. One-half clock cycle later, all $S_1$s go low again because the B8ZS pattern is no longer being detected, and normal shifting of the pulse train resumes.

The net result of the operation of the circuit of FIG. 3 is that when the positive rail output signal 82 and the negative rail output signal 92 are combined (FIG. 2), the pulse train has assumed the form of FIG. 4, in which the intentional bipolar violations introduced by the B8ZS pattern have been eliminated but the unintentional bipolar violation 22 of FIG. 1b is still present. Thus, the output of the circuit of FIG. 3 can be used for bipolar violation error counting for span switching purposes regardless of whether or not B8ZS is used in the incoming signal.

If it is known that a certain installation will not use B8ZS, the bypass switch 78 can be closed so that a malfunction in chips 68, 70, 84, 86 or in flip-flops 106, 108 will not affect the operation of the span line switch 30.

We claim:

1. A method of making bipolar violation error counters nonresponsive to bipolar violations generated by bipolar eight-zero suppression techniques but responsive to all other bipolar violations, comprising the steps of:

(a) detecting the presence of B8ZS patterns in a bipolar pulse train;
(b) zeroing only those bits of each detected B8ZS pattern in said pulse train which cause bipolar violations; and
(c) transmitting the thus altered pulse train to a bipolar violation error counter.

2. The method of claim 1, in which said detecting step includes the substeps of:
(i) shifting said pulse train through nine-bit shift register means; and
(ii) producing a zeroing signal whenever the contents of said shift register means have the logic levels indicative of the presence of a B8ZS pattern in said shift register means;
and in which said zeroing step includes the substep of using said zeroing signal to force a zero in those stages of said shift register means which contain the bipolar violation-causing bits of said B8ZS pattern.

3. The method of claim 2, in which said bipolar violation-causing bits are the fourth and seventh bits of said pattern.

4. The method of claim 3, in which said pulse train is separated into positive and negative rails, said rails being applied to positive and negative nine-bit shift registers, respectively; and said zeroing signal is produced by the sub-substeps of:
(1) producing a first signal when the fourth and eighth bit of said B8ZS pattern and the bit immediately preceding said B8ZS pattern in said positive shift register are all "1", and the fifth and seventh bit in said negative shift register are both "1";
(2) producing a second signal when the fourth and eighth bit of said B8ZS pattern and the bit immediately preceding said B8ZS pattern in said negative shift register are all "1", and the fifth and seventh bit on said positive shift register are both "1";
(3) producing a third signal when the first, second, third, and sixth bits of said B8ZS pattern are all zero in both said positive and negative shift registers; and
(4) producing said zeroing signal whenever said third signal and either said first or second signal are simultaneously present.

5. Apparatus for preventing a bipolar violation error counter from counting bipolar violations arising from the use of bipolar eight-zero suppression, comprising:
(a) input means for receiving a bipolar pulse train containing B8ZS patterns;
(b) detection means for detecting the presence of said B8ZS patterns in said pulse train;
(c) zeroing means actuated by said detection means for zeroing only bipolar violation-causing bits in said B8ZS patterns; and
(d) output means for transmitting the thus altered pulse train to said error counter.

6. The apparatus of claim 5, in which said detection means include:
(i) nine-bit shift register means connected to said input means for continually storing nine consecutive bits of said pulse train; and
(ii) zeroing signal producing means connected to said shift register means for producing a zeroing signal whenever the contents of said shift register means are such as to indicate the presence of a B8ZS pattern in said shift register means;
and in which said zeroing means include means actuated by said zeroing signal means for forcing zeros in those stages of said shift register means which contain said bipolar violation-causing bits.

7. The apparatus of claim 6, in which said bipolar violation-causing bits are the fourth and seventh bits of said B8ZS pattern.

8. The apparatus of claim 6, in which said shift register means include nine-bit positive-rail and negative-rail shift registers; and in which rail separation means are interposed between said input means and said detection means, the positive and negative rails of said bipolar pulse train being applied to said positive-rail and negative-rail shift registers, respectively.

9. The apparatus of claim 8, in which said zeroing signal producing means include:
(i) first logic means for producing a first signal when a logic "1" appears in those stages of said shift registers in which a "1" should appear when a positive B8ZS pattern is present, as well as in the stage containing the bit immediately preceding said B8ZS pattern;
(ii) second logic means for producing a second signal when a logic "1" appears in those stages of said shift registers in which a "1" should appear when a negative B8ZS pattern is present, as well as in the stage containing the bit immediately preceding each B8ZS pattern;
(iii) third logic means for producing a third signal when a zero appears in all of those stages of said shift registers in which a zero should appear when any B8ZS pattern is present; and
(iv) fourth logic means for producing a zeroing signal when said third signal and either said first or said second signal are present.

10. The apparatus of claim 9, in which said first and second logic means are NAND gates, said third logic means is a NOR gate, and said fourth logic means is a half-clock-cycle delay flip-flop means.

11. The apparatus of claim 9, in which said logic "1" stages of said B8ZS pattern in said first logic means are the stages containing the fourth and eighth bits of said B8ZS pattern in said positive-rail shift register, and the fifth and seventh bits of said B8ZS pattern in said negative-rail shift register; and in which said logic "1" stages of said B8ZS pattern in said second logic means are the stages containing the fifth and seventh bits of said B8ZS pattern in said positive-rail shift register, and the fourth and eighth bits of said B8ZS pattern in said negative-rail shift register.

12. The apparatus of claim 11, in which said shift reigsters are at least in part switchable between a direct shifting mode and a controlled shifting mode in which each shifted bit is individually controlled by a separate logic input.

13. The apparatus of claim 12, in which said zeroing signal switches said shift registers from said direct shifting mode to said controlled shifting mode; and the logic inputs of the stages containing the bipolar violation-causing bits of said B8ZS pattern when said zeroing signal is present are permanently zero.

14. The apparatus of claim 12, further comprisiing switchable bypass means for selectively bypassing said switchable portions of said shift registers.

15. The apparatus of claim 8, in which said zeroing signal is applied to said shaft registers to force a zero in those stages of said shift registers which contain the bipolar violation-producing bits of B8ZS pattern.

* * * * *